March 27, 1956  F. K. H. NALLINGER  2,740,104
COMBINATION TAIL AND SIGNAL LIGHT FOR VEHICLES
Filed Oct. 9, 1950

Inventor
Friedrich K. H. Nallinger
By Hicks and Padlon
Attorneys

United States Patent Office 2,740,104
Patented Mar. 27, 1956

2,740,104
COMBINATION TAIL AND SIGNAL LIGHT FOR VEHICLES

Friedrich K. H. Nallinger, Stuttgart, Germany

Application October 9, 1950, Serial No. 189,086

Claims priority, application Germany October 8, 1949

5 Claims. (Cl. 340—84)

This invention relates to combination tail and signal light for vehicles and it is an object of the invention to provide such a structure in which the signal may be to indicate stopping and/or turning.

Another object of the invention relates to such a device in which proper lighting and easily understood signals are given in spite of the nearness of the several light beams to each other. Furthermore, an esthetically satisfying form of the light structure is provided.

The combination of the different lights in one common lamp body is desired for aesthetic and constructional reasons. On the other hand such a simplification involves the possibility that the stoplight is not sufficiently distinguishable from the tail light at night.

Therefore an essential feature of the invention consists in the fact that the lights, for instance for stoplight, tail light and possibly also intermittent light (for instance to indicate the driving direction) are arranged concentrically or essentially concentrically to one another. In this case the outer lights can be recognized by the eye as annular continuous annular or also as interrupted lighting bands. In order to make the differences of the form of the lights thus obtained more obvious, the light units can, according to a further feature of the invention, have different forms of outlines, by making for instance the outer light unit exit opening deviating more or less from the annular form, for instance elliptical, square or otherwise. By enlarging the lighting areas an especially good optical effect can be obtained. According to a further feature of the invention different colors can be chosen for the lights, too.

Another feature of the invention consists furthermore in the fact that the light units include concentrically or essentially concentrically arranged concave mirrors, nested for instance within one another and having different diameters. The mirrors can be of circular, parabolic or parabola-like or other similar suitable form. Besides covering plates of circular or any other desired form can be provided for the lights.

The application of the concentric light units can be chosen arbitrarily for the different purposes. The inner middle light unit, for instance, can be used as tail light, the light unit arranged concentrically or essentially concentrically to this as stoplight, while a third outer light unit can serve for instance as intermittent light. But the inner middle light unit can for instance also serve as stoplight and the outer as tail light. To avoid confusion, a standard way of application should be determined.

Further objects and advantages of the present invention will become more obvious from the following description of several preferred embodiments of the present invention when taken in connection with the accompanying drawing which shows for purposes of illustration only such preferred embodiments, and wherein.

Figure 1:
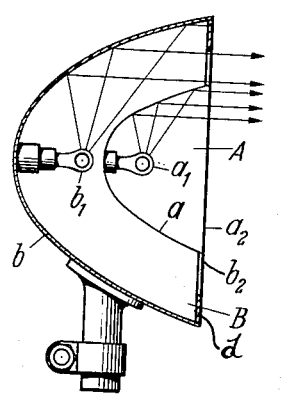
Figure 1 is a cross sectional view of one embodiment in accordance with the present invention.

Fig. 1 shows a combined lighting body with two lights A and B arranged concentrically to each other, whose parabolic concave mirrors $a$ and $b$ with different diameters are nested concentrically within one another. The light sources $a_1$, and $b_1$, for instance light bulbs, are arranged in or nearly in the foci of their respective concave mirrors in such a way that beams of light with parallel or slightly conical rays are produced, as shown in the drawing. The inner glass pane $a_2$ and the outer annular glass pane $b_2$ can be of different color. The middle light can for instance be used as tail light, the outer light arranged concentrically to that as stoplight.

Figure 3:
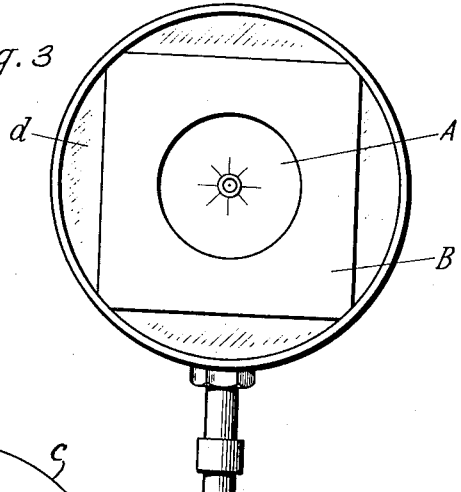
Figure 3 is a front view of the embodiment shown in Figure 1.

As shown in Figure 3, which represents a front view of Figure 1, the outer light unit B may be covered toward the outer part thereof by an approximately internally square and externally circular covering plate $d$ so that the light produced by lamp $b_1$ shows a similar lighting area defined by the circular form of the center light unit A, on the one hand, and by the square internal form of the covering plate $d$, on the other hand. Of course, any other desired form may be chosen for the internal covering plate $d$ as long as the geometric form thereof is different from the circular outer form of light unit A.

Figure 2:
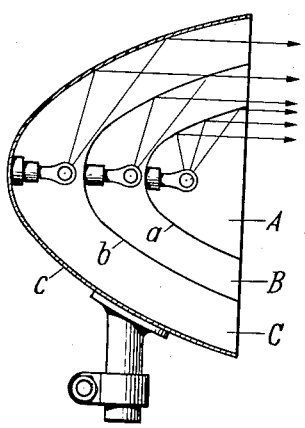
Figure 2 is a cross sectional view of another embodiment in accordance with the present invention.
Figure 4:
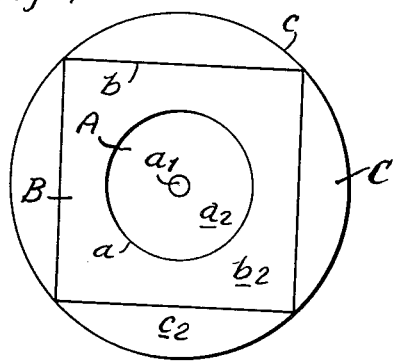
Figure 4 is a front view of the embodiment shown in Figure 2.

In the example illustrated in Figures 2 and 4, three light units A, B and C are provided, which include concave, concentrically nested mirrors $a$, $b$ and $c$, respectively. Panes $a_2$, $b_2$ and $c_2$ are associated with light units A, B and C, respectively.

In the embodiment illustrated in Figures 2 and 4, the light unit A may, for example, be used as a tail light, the light unit B as a stop light, and the light unit C as intermittent turn indicator.

By providing different geometric forms for the light for respectively adjacent light units, it is quite clear that an observer of the lamp assembly will not only observe the flashing of a particular light unit, but, in contradistinction to present existing devices, a definite information will be conveyed to such observer by the particular geometric form of the particular light unit which is flashed. Thus, the difference between energization of the tail light and energization of the tail light and stop light, for example, will not only be indicated by a difference in brightness of the light, as is the case in presently used devices, but will also be clearly indicated by difference in geometric forms of the energized lights.

While the difference in brightness of the light is, of course, one of degree only, and therefore may pass unnoticed by a momentary observer, there can be no doubt of the particular light units energized in the arrangement in accordance with the present invention, since the geometric forms convey a very definite meaning which is agreed upon beforehand.

While I have herein shown and described only certain embodiments of certain features of my present invention, it is to be understood that they are to be regarded merely as illustrative and that I do not intend to limit myself thereto except as may be required by the following claims.

What I claim is:

1. Combination tail and signal light for vehicles comprising a plurality of light units, each having a light bulb and a reflector, the reflectors being of different sizes and nested in spaced relation concentrically one within another, the contours of adjacent reflectors determining the outline of respective light beams being of distinctive basic different geometric forms so as to vary the overall outline of the visible light beam during simultaneous energization of an additional one of said bulbs from that resulting from the energization visible during pre-existing conditions of energization without said additional one of said bulbs.

2. Combination tail and signal light according to claim 1, wherein the light exit openings of the inner and the outer of two nested reflectors are of circular form and the rim edge of the inner reflector has a non-circular closure shield.

3. Combination tail and signal light according to claim 1, wherein the openings of the inner and the outer of three nested reflectors are of round formation and the opening of the middle reflector is non-circular.

4. Combination tail or signal light according to claim 1, wherein the inner lamp is formed as a tail light and the outer as a stop light.

5. Combined tail or signal light according to claim 1, wherein the inner lamp is used as a tail light, the middle lamp as a stop light, and the outer lamp as a direction indicating light.

References Cited in the file of this patent

UNITED STATES PATENTS

| | | |
|---|---|---|
| 1,262,394 | Schickerling | Apr. 9, 1918 |
| 1,351,635 | Forsberg | Aug. 31, 1920 |
| 1,614,650 | Carstarphen | Jan. 18, 1927 |
| 1,658,668 | Battschau | Feb. 7, 1928 |
| 2,228,021 | Van Vleck | Jan. 7, 1941 |
| 2,228,835 | Leppert | Jan. 14, 1941 |